United States Patent [19]
Wilson et al.

[11] 3,853,850
[45] Dec. 10, 1974

[54] CRYSTALLINE COMPLEX OF PENICILLIN G 1(S)-OXIDE AND PROCESS FOR PREPARING SAME

[76] Inventors: Edward McKenzie Wilson, Wayside Birkett Hill, Westmorland; Alfred Bartley Taylor, The Pantiles, Jordans Way, Jordans, Beaconsfield, both of England

[22] Filed: Jan. 16, 1973

[21] Appl. No.: 324,169

[30] Foreign Application Priority Data
Jan. 20, 1972  Great Britain....................... 2794/72

[52] U.S. Cl............. 260/239.1, 424/271, 260/243 C
[51] Int. Cl.............................................. C07d 99/16

[58] Field of Search................................. 260/239.1

[56] References Cited
UNITED STATES PATENTS
3,198,804   8/1965   Johnson et al................... 260/239.1

Primary Examiner—Nicholas S. Rizzo
Attorney, Agent, or Firm—Bacon & Thomas

[57] ABSTRACT

A crystalline complex of penicillin G 1(S)-oxide and acetone is described, the complex being a useful intermediate in the preparation of other penicillins and cephalosporins. The complex may be prepared by contacting the oxide or a salt or other complex thereof with acetone.

10 Claims, No Drawings

CRYSTALLINE COMPLEX OF PENICILLIN G 1(S)-OXIDE AND PROCESS FOR PREPARING SAME

This invention concerns improvements in or relating to penicillin derivatives. More particularly it concerns a derivative of penicillin G (i.e. (3S, 5R, 6R)-2,2-dimethyl-6-phenylacetamidopenam-3-carboxylic acid).

Penicillin G, besides being an important antibiotic, is a valuable intermediate for the preparation of other penicillins and, by ring expansion, of cephalosporin derivatives. However, on account of the instability of penicillin G in the free acid form, particularly in aqueous systems, special techniques have to be used to effect efficient isolation of this compound from fermentation broths. For instance, it is essential that the extraction process be conducted quickly, and that selective and somewhat expensive purification schemes be used to isolate a penicillin G product of greater stability than the free acid (e.g. a suitable salt) and of acceptable purity.

Thus, plant breakdowns and other delays in processing can cause losses due to decomposition; furthermore, it is a wasteful necessity to prepare a salt such as the potassium salt or to use the costly N-ethylpiperidine in order to effect an efficient and selective precipitation of penicillin G, as its N-ethylpiperidinium salt. In this way crude penicillin G is freed from other contaminating materials, particularly the decomposition products and other acids produced by metabolic processes ocurring in the fermentation.

Oxidation of the sulphur atom of a penicillin acid is known to confer enhanced stability on the free acid such that, if this oxidation and subsequent isolation of the product could be effected efficiently and cheaply, valuable simplification and economic improvement of the isolation process for penicillin nucleus, as the 1(S)-oxide, could be achieved. Such a scheme, starting with penicillin G, would provide a most attractive intermediate to thiazolidine ring-expansion processes, leading to the cephalosporin series of compounds, and to a wide range of useful penicillin derivatives, particularly to series of compounds not directly or conveniently available from penicillin G itself. Furthermore, if desired, the 1(S)-oxide can be reduced back to the sulphide by known methods. Thus, overall advantages in converting one penicillin to another can be gained by oxidising the first penicillin to the 1(S)-oxide early in the process, carrying out subsequent chemical transformations and, if needed, reducing the 1(S)-oxide products back to their corresponding penicillins later in the process.

However, penicillin G 1(S)-oxide is not easy to isolate in a pure state from the products of oxidation of penicillin G, particularly when the latter is itself a crude product. Furthermore it has the serious drawback of retaining water of crystallisation very tenaciously. Even heating under vacuum at 50° C for 48 hours fails to give an anhydrous product, and more vigorous heating tends to cause decomposition. Thus penicillin G 1(S)-oxide, particularly the fairly impure product which is usually isolated from fermenters or fermenter extracts, is not a suitable starting material for processes which require anhydrous conditions.

We have now found, according to one aspect of this invention, that penicillin G 1(S)-oxide forms a crystalline solvate with acetone. This solvate is substantially water-free and is a valuable intermediate for the isolation of penicillin G 1(S)-oxide in an anhydrous state and in good purity. For many chemical purposes it is equivalent to penicillin G (1(S)-oxide itself. The proportion of acetone to penicillin G 1(S)-oxide in the solvate is about 1:1 on a molar basis.

The invention also provides a process for preparing penicillin G 1(S)-oxide acetone solvate comprising contacting penicillin G 1(S)-oxide or other solvates thereof e.g. a hydrate, with acetone.

The acetone solvate may be formed by simply precipitating penicillin G 1(S)-oxide in the presence of acetone or by contacting a solid hydrate or other solvate (other than the acetone solvate) of penicillin G 1(S)-oxide with acetone. It is remarkable that, even in the presence of an excess of water, the solvate is formed in preference to the hydrate.

One may precipitate the solvate by addition of acid to a solution (e.g. an aqueous solution) or slurry of a salt of penicillin G 1(S)-oxide in the presence of acetone, generally at a temperature of $-20°$ to $+80°C$, and preferably at a temperature below 0°C., e.g. at about $-10°C$. The salt may be an alkali metal salt e.g. sodium or potassium or an organic ammonium salt e.g. triloweralkylammonium such as triethylammonium; piperidinium; N-loweralkylpiperidinium e.g. N-ethylpiperidinium; or benzylammonium. The lower alkyl groups just referred to may have 1–6 carbon atoms. Sufficient acid should be added to lower the pH to a value less than about 3, e.g. to 1.0–2.5. Preferred acids include hydrochloric, sulphuric and nitric acids; formic and phosphoric acids may also be used. Precipitation may also be assisted by cooling the solution of penicillin G 1(S)-oxide.

Alternatively, one may form the acetone solvate by slurrying penicillin G 1(S)-oxide in hydrated form with acetone. The acetone solvate may thus be formed without the penicillin G 1(S)-oxide ever passing fully into solution. This reaction is preferably performed at low temperature, e.g. below 10° C. and preferably at about 0° C, although higher temperatures may be used. The precise degree of hydration of the starting material is not important; partially dried material can be conveniently used.

We have found that penicillin G 1(S)-oxide forms a number of solvates with other solvents, e.g. methylene chloride and methanol. These solvates may be converted to the acetone solvate in the same manner as the hydrate by treating with an excess of acetone.

The acetone solvate can be dried in vacuo at a slightly elevated temperature, preferably below 45° C., e.g. at about 35° C.

Penicillin G 1(S)-oxide may be made by the oxidation of a salt of penicillin G. We have found that this process is advantageously carried out by reaction in solution with a per-acid, preferably an organic per-acid e.g. peracetic acid, at a temperature not above 50° C., e.g. in the range $-10°$ to $+15°$ C.

The oxidant is advantageously chosen to yield water-soluble products on acidification with a mineral acid in the reaction mixture. Peracetic acid is very suitable for this purpose. Another oxidant of value in this connection is sodium metaperiodate. Suitable salts include those mentioned above.

The oxidation reaction can be performed by adding oxidant until chemical tests show that a slight excess is present. This method is convenient if the starting penicillin material is of unknown purity. Alternatively the reaction can be followed by periodically assaying the reaction mixture (e.g. by a chromatographic technique) and noting the disappearance of the penicillin G.

The reaction may be carried out in aqueous solution, in which case the product is conveniently isolated by precipitation with a strong acid, e.g. hydrochloric acid or sulphuric acid; the precipitated solid is then separated in a conventional manner, e.g. by filtration or centrifugation.

One may either precipitate the penicillin G 1(S)-oxide itself and subsequently form the solvate or precipitate the solvate directly without isolation of the oxidised penicillin by ensuring that acetone is present during the precipitation step. This latter procedure is often more convenient. The acetone may for example be added either just before or during acidification, or may form part of the reaction medium in which the oxidation is carried out.

The oxidation may, if desired, be performed in a non-aqueous or partially aqueous organic solvent medium which is substantially inert to the oxidising conditions employed. Examples of such organic solvents are lower aliphatic ketones, notably acetone; lower aliphatic esters e.g. ethly acetate or butyl acetate; aliphatic and heterocyclic ethers, e.g. tetrahydrofuran; N-substituted amides, e.g. N,N-dimethylformamide and chlorinated hydrocarbons e.g. chloroform. When it is desired to isolate an acetone solvate from the reaction mixture (without prior isolation of the penicillin G 1(S)-oxide) it may be desirable to avoid the presence of excessive amounts of other organic solvents, especially those which form stable solvates.

When an organic or aqueous-organic reaction medium is employed, involving a water-immiscible organic solvent, the product is conveniently isolated by extraction into aqueous base or aqueous buffer followed by precipitation with a strong acid. As aqueous base, alkali metal carbonates and bicarbonates may be mentioned, e.g. sodium or potassium carbonates. A suitable buffer is pH 9.5 sodium phosphate/sodium bicarbonate, which gives an aqueous extract of ca pH 7. The strong acid will generally be hydrochloric acid or sulphuric acid.

Whatever reaction medium or method of isolation is chosen, it is desirable to isolate the penicillin G 1(S)-oxide product (or its acetone solvate) with avoidance of elevated temperatures which could cause decomposition. It is preferable to keep the temperature below 25° C, advantageously below 10° C.

The penicillin G used as starting material (in the form of its salt) may be purified material. However, the oxidation reaction can be performed satisfactorily on crude starting material, for example on filtered fermentation broth containing penicillin G. This is advantageous in view of the greater stability of the 1(S)-oxide as compared to penicillin G itself in its free acid form. When the fermentation broth is used this may be filtered, acidified (e.g. with a strong acid) and extracted with an organic solvent to give an organic solvent solution of crude penicillin G. The organic solvent is preferably selected to be suitable as reaction medium in the oxidation process and may be one of those mentioned above (other than water-miscible solvents such as acetone).

The organic solvent extract may if desired be re-extracted with aqueous base (e.g. an alkali metal carbonate or bicarbonate, preferably sodium or potassium carbonate) and the aqueous extract then used as starting material optionally after addition of pH buffering components.

From the foregoing it can be appreciated that penicillin G 1(S)-oxide acetone solvate formation is a key step allowing new and cheaper processes for the extraction of penicillin G from fermenters to be introduced. Clearly sulphoxidation of penicillin G is desirable since the greater stability of penicillin G 1(S)-oxide over penicillin G free acid itself enables decomposition losses during extraction to be minimised. Furthermore, in carrying out sulphoxidation one is effecting a necessary step in such processes as the important conversion or penicillins into cephalosporins. Finally, the process of converting penicillin G 1(S)-oxide, and especially the crude hydrated product obtained from the fermenters, into its acetone solvate not only enables the 1(S)-oxide to be isolated in a substantially anhydrous state but also simultaneously effects a substantial purification of the crude 1(S)-oxide.

In order that the invention may be better understood the following Examples are given by way of illustration only. Temperatures are in °C.

EXAMPLE 1

Penicillin G 1(S)-oxide acetone solvate:oxidation of penicillin G N-ethylpiperidinium salt in water followed by slurrying the undried sulphoxide in acetone Peracetic acid (800 ml. of a 37percent w/w - solution in aqueous acetic acid, 4.4 mol.) was added over 15minutes to a stirred suspension of penicillin G N-ethylpiperidinium salt (1790 g., 4 mol.) in water 5 litres), the temperature being kept between + 1° and + 6°. IN-Hydrochloric acid (4.4 litres., 4.4 mol.) was added over 30 minutes to the resulting solution, the temperature being kept between + 1° and + 3°, and the suspension was stirred at + 2° for 1 hour. The mixture was filtered, and the filter cake washed with water (4 × 1 litre), and sucked free of surplus water, giving a white solid (2,140 g., water content by Karl Fischer analysis, 36.7 percent).

A portion (50 g.) of this water-wet solid was stirred in acetone (50 ml.) at 0° for 2 hours, the mixture filtered, and the filter cake washed with chilled acetone (50 ml.), then dried in vacuo at 35° for 16 hours, giving penicillin G 1(S)-oxide acetone solvate (34.7 g., 91.2%), m.p. 156°, $[\alpha]_D^{20}$ + 242° (c 1.00, 3%—NaHCO$_3$), $\nu$ max. (Nujol) 3408 (NH), 1794 ($\beta$-lactam), 1745 (CO$_2$H), 1708 (acetone), 1679 and 1507 (CONH), 973 cm.$^{-1}$ (S=O), $\tau$ (DMSO-d6) 2.13 (doublet, J 9 Hz; CONH), 2.75 (singlet; phenyl protons), 4.23 (double doublet, J 4.5, 9 Hz; C-6H), 4.63 (doublet, J 4.5 Hz; C—5H), 5.68 (singlet; C—3H), 6.41 (singlet; CH$_2$CO), 7.94 (singlet; acetone), 8.44, 8.82 (two singlets; C—2 Me$_2$). (Found: C, 55.5; H, 5.9; N, 6.9; S, 7.9.C$_{19}$H$_{24}$N$_2$O$_6$S requires C, 55.9; H, 5.8; N, 6.9; S, 7.9%).

EXAMPLE 2

Penicillin G 1(S)-oxide acetone solvate:oxidation of penicillin G N-ethylpiperidinium salt in water followed by slurrying the partially dried sulphoxide in acetone Example 1 was repeated on a larger scale using 2,240g, 5 mol. of penicillin G N-ethylpiperidinium salt to yield water-wet sulphoxide (2307 g., water content by Karl Fischer analysis 26.9 percent). A portion (1310 g.) of this wet solid was dried in a vacuum oven at 50° for 48 hours, giving partially dried sulphoxide as a white solid (1,000g., water content 4.4 percent). A portion (50 g.) of this partially dried material was stirred in acetone (50 ml.) at 0° for 3 hours, the mixture filtered, and the filter cake washed with chilled acetone (50 ml.), then dried in vacuo at 35° for 16 hours, giving penicillin G 1(S)-oxide acetone solvate (54.5g., 94.3 percent), m.p. 155°, $[\alpha]_D^{20} + 240°$ (c 1.00, 3%–NaHCO$_3$).

EXAMPLE 3

Penicillin G 1(S)-oxide acetone solvate: oxidation of penicillin G potassium salt in water followed by slurrying the partially dried sulphoxide in acetone Peracetic acid (40 ml. of a 38 percent w/w-solution in aqueous acetic acid, 0.22 mol.) was added over 30 minutes to a stirred solution of penicillin G potassium salt (74.7g., 0.20 mol.) in water (225 ml.), the temperature being kept between 0° and + 3°. Ca.1.16 N-hydrochloric acid (225 ml.) was added over 30 minutes, the temperature being kept between 0° and + 1°. The suspension was stirred at 0° for 1 hour, then filtered, and the filter cake washed with water (3 × 100 ml.), then dried in vacuo at 50° for 16 hours, giving a white powder (67.3g., water content 2.2 percent). A portion (50 g.) of this dried material was stirred in acetone (75 ml.) at −5° for 2 hours, the mixture filtered, and the filter cake washed with chilled acetone (2 × 50 ml.), then dried in vacuo at 35° for 16 hours, giving penicillin G 1(S)-oxide acetone solvate (57.1 g., 94.1 percent), m.p. 152°, $[\alpha]_D^{20} + 243°$ (c 1.00, 3%—NaHCO$_3$).

EXAMPLE 4

Penicillin G 1(S)-oxide acetone solvate: oxidation of crude penicillin G potassium salt in water followed by slurrying the partially dried sulphoxide in acetone Peracetic acid (40 ml. of a 38 percent w/w-solution in aqueous acetic acid) was added over 30 minutes to a stirred solution of crude penicillin G potassium salt (74.7g., prepared by adding potassium carbonate to a butyl acetate extract of fermentation liquors, estimated purity 79 percent) in water (225 ml.), the temperature being kept between 0° and + 3°. ca. 1.16 N-hydrochloric acid (225 ml.) was added over 1 hour, very slowly at first (rapid addition leads to a gummy product), to the previously seeded solution, the temperature being kept between −3° and 0°. The suspension was stirred at −5° for 1 hour, then filtered, and the filter cake washed with water (3 × 100 ml.), then dried in vacuo at 50° for 16 hours, giving a pale brown powder (58.0g., water content 8.5 percent).

A portion (50g.) of this dried material was stirred in acetone (75 ml.) at −5° for 2 hours, the mixture filtered, and the filter cake washed with chilled acetone (2 × 50 ml.), then dried in vacuo at 35° for 16 hours, giving penicillin G 1(S)-oxide acetone solvate (52.7g., 94.2 percent), m.p. 153°, $[\alpha]_D^{20} + 240°$ (c 1.00, 3 percent—NaHCO$_3$).

EXAMPLE 5

Penicillin G 1(S)-oxide acetone solvate: oxidation of penicillin G N-ethylpiperidinium salt in aqueous acetone, precipitation with hydrochloric acid Peracetic acid (40 ml. of a 38 percent w/w solution in aqueous acetic acid, 0.22 mol.) was added over 15 minutes to a stirred suspension of penicillin G N-ethylpiperidinium salt (89.7g., 0.20 mol.) in water (90 ml.) and acetone (90 ml.) at −10°. Concentrated hydrochloric acid (26 ml., 0.30 mol.) was added over 20 minutes to the resulting solution, kept at =10°. The suspension was stirred at −10° for 1 hour, the mixture filtered, and the filter cake washed with chilled acetone (2 × 75 ml.), then dried in vacuo at 35° for 16 hours, giving penicillin G 1(S)-oxide acetone solvate (77.3g., 94.7 percent), m.p. 151°, $[\alpha]_D^{20} + 240°$ (c 1.00, 3 percent—NaHCO$_3$).

EXAMPLE 6

Penicillin G 1(S)-oxide acetone solvate: oxidation of penicillin G potassium salt in aqueous acetone Peracetic acid (40 ml. of a 38 percent w/w solution in aqueous acetic acid, 0.22 mol.) was added over 15 minutes to a solution of penicillin G potassium salt (74.7g., 0.20 mol.) in water (135 ml.) and acetone (45 ml.) at 0°. Concentrated hydrochloric acid (26 ml., 0.30 mol) was added over 15 minutes at 0°. The resulting suspension was stirred at −5° for 2 hours, the mixture filtered, and the filter cake washed with chilled acetone (2 × 50 ml.), then dried in vacuo at 35° for 16 hours, giving penicillin G 1(S)-oxide acetone solvate (77.5g., 94.8 percent), m.p. 152°, $[\alpha]_D^{20} + 241°$ (c 1.00, 3 percent—NaHCO$_3$).

EXAMPLE 7

Penicillin G 1(S)-oxide acetone solvate: oxidation of crude penicillin G potassium salt in aqueous acetone Example 6 was repeated except that crude potassium G potassium salt (74.7 g., prepared by adding potassium carbonate to a butyl acetate extract of fermentation liquors, estimated purity 79 percent) was used as input. Penicillin G 1(S)-oxide acetone solvate was obtained as a grey solid (60.6g., 93.4 percent), m.p. 147°, $[\alpha]_D^{20} + 238°$ (c 1.00, 3 percent—NaHCO$_3$).

EXAMPLE 8

Penicillin G 1(S)-oxide acetone solvate: oxidation of penicillin G N-ethylpiperidinium salt in acetone Peracetic acid (40 ml. of a 38 percent w/w-solution in aqueous acetic acid, 0.22 mol.) was added over 15 minutes to a stirred suspension of penicillin G N-ethylpiperidinium salt (89.7g., 0.20 mol.) in acetone (90 ml.) at −10°. Concentrated sulphuric acid (7.8ml., 0.15 mol.) was added over 20 minutes to the resulting solution, kept at −10°. The suspension was stirred at −10° for 1 hour, the mixture filtered, and the filter cake washed with chilled acetone (2 × 75 ml.), then dried in vacuo at 35° for 16 hours, giving penicillin G 1(S)-oxide acetone solvate (75.0g., 92.0 percent), m.p. 145°, $[\alpha]_D^{20} + 238°$ (c 1.00, 3 percent—NaHCO$_3$).

EXAMPLE 9

Penicillin G 1(S)-oxide acetone solvate: oxidation of penicillin G in a sodium carbonate extract of a butyl acetate extract of fermentation broth followed slurrying the partially dried sulphoxide in acetone a. 6 litres of a butyl acetate extract of acidified penicillin filtered broth, containing 156 gms. of penicillin G, was extracted with water (600 ml.) containing sodium carbonate (48.3g.). The sodium carbonate was equivalent to the total acid content of the butyl acetate extract. To the aqueous extract peracetic acid (about 75 ml. of a 37.7 percent solution in acetic acid) was added at <5° C over 15 minutes, until excess was detected by starch/KI papers. The solution was stirred for a further 10 minutes and if excess peracetic acid was not present, more was added. This procedure was continued until the starch/KI test remained positive.

The pH of the solution was then reduced to 2 by addition of 30 percent sulphuric acid (200 ml.). The penicillin G sulphoxide acid was precipitated. The slurry was filtered, washed with water (300 ml.) and dried at 40° C in a vacuum oven for 20 hours. Weight of solid 149g. $[\alpha]_D^{20} = +244°$.

80g. of the dried material were slurried in acetone (110 ml.) at 0° C for 2 hours. At the end of this time the slurry was filtered, the solid washed with acetone (80 ml.) and dried in vacuum at room temperature. Weight 81.8g. $[\alpha]_D^{20} = +228°$ Purity 92.6 percent.

Efficiency (butyl acetate solution to final solid) = 92.6%.

b. 1 litre of a partially purified butyl acetate extract of filtered broth containing 79.3 g. of penicillin G was extracted into a sodium carbonate solution (300 ml.) and oxidised with peracetic acid in acetic acid as in (a) above. The oxidised aqueous solution was acidified to pH 1.5 by addition of 15 percent sulphuric acid (120 ml.). The slurry of sulphoxide acid was filtered off at low temperatures (<5° C) and washed with 200 ml. of chilled water. The solid was dried at 40° C in a vacuum oven for 16 hours. Weight 83.4g.

This material was converted to the acetone solvate as under (a) above. Before filtration the acetone slurry was adjusted to pH 1.5 by addition of a few drops of concentrated sulphuric acid. Weight of acetone solvate 89g. $[\alpha]_D^{20} + 243°$. Purity 99 percent. Efficiency (butyl acetate solution to final solid) 94.6 percent.

EXAMPLE 10

Penicillin G 1(S)-oxide acetone solvate: slurrying penicillin G 1(S)-oxide methanol solvate in acetone A portion (50 g.) of the water-wet (36.7 percent) penicillin G sulphoxide prepared in example 1 was stirred in methanol (50 ml.) at 0° for 2 hours, the mixture filtered, and the filter cake washed with chilled methanol (50 ml.), then dried in vacuo at 35° for 16 hours, giving penicillin G 1(S)-oxide methanol solvate (331.g., 92.7 percent), m.p. 150°, $[\alpha]_D^{20} + 260°$ (c 1.00, 3 percent—NaHCO₃), $\nu$ max. (Nujol) 3366 (OH and NH), 1797 ($\beta$-lactam), 1722 (CO$_2$H), 1685 and 1515 (CONH), 990 cm.$^{-1}$ (S=O), $\tau$ (DMSO-d6) 2.16 (doublet, J 9 Hz; CONH), 2.76 (singlet; phenyl protons), 4.23 (double doublet, J 4.5,9 Hz; C—6H), 4.64 (doublet, J 4.5 Hz; C—5H), 5.67 (singlet; C—3H), 6.41 (singlet; CH$_2$CO), 6.82 (singlet; CH$_3$O), 8.43, 8.81 (two singlets; C—2Me$_2$). (Found: C, 53.3; H, 5.8; N, 7.5; S, 8.3. $C_{17}H_{22}N_2O_6S$ requires C, 53.4; N, 5.8; N, 7.3; S, 8.4 percent).

Penicillin G 1(S)-oxide methanol solvate (10g.) was stirred in acetone (100 ml.) at −10° for 2 hours. The suspension was filtered, and the filter cake washed with chilled acetone (25 ml.), then dried in vacuo at 35° for 16 hours, giving penicillin G 1(S)-oxide acetone solvate (10g., 93.7 percent), m.p. 155°, $[\alpha]_D^{20} + 245°$ (c 1.00, 3 percent—NaHCO₃), infrared spectrum identical with that of authentic material.

We claim:
1. The 1:1 molar crystalline complex of penicillin G 1(S)-oxide with acetone.
2. A process for preparing the 1:1 molar complex of penicillin G 1(S)-oxide with acetone comprising contracting acetone with a member selected from the group consisting of penicillin G 1(S)-oxide, an alkali metal, triloweralkylammonium, piperidinium, N-loweralkylpiperidinium, or benzylammonium salt thereof, a hydrate thereof, a complex thereof with methanol and a complex thereof with methylene chloride.
3. A process as claimed in claim 2 wherein the acetone complex is formed by precipitating penicillin G 1(S)-oxide in the presence of acetone.
4. A process as claimed in claim 3 wherein the precipitation is effected by addition of acid to a solution or slurry of said salt of penicillin G 1(S)-oxide in the presence of acetone.
5. A process as claimed in claim 4 wherein the precipitation is effected in aqueous solution at a temperature of below 0° C and sufficient acid is added to lower the pH to less than about 3.
6. A process as claimed in claim 2 wherein the acetone complex is formed by contacting acetone with a solid penicillin G 1(S)-oxide compound selected from the group consisting of hydrated penicillin G 1(S)-oxide, a complex of penicillin G 1(S)-oxide with methanol and a complex of penicillin G 1(S)-oxide with methylene chloride.
7. A process as claimed in claim 6 wherein hydrated penicillin G 1(S)-oxide is slurried with acetone at a temperature below 10° C.
8. In a process as defined in claim 2 for the preparation of a complex of penicillin G 1(S)-oxide with acetone, the step of forming the penicillin G 1(S)-oxide starting material by a process comprising oxidising said salt of penicillin G in solution with a peracetic acid at a temperature not above 50° C to provide a solution of the oxidised penicillin.
9. A process as claimed in claim 8 wherein the oxidation is performed on a fermentation broth of penicillin G or an extract of such a broth.
10. In a process as claimed in claim 8, the step of precipitating the acetone complex by the addition of acid to the reaction solution containing the oxidised penicillin and acetone.

* * * * *